US007117213B2

(12) United States Patent
McDermott et al.

(10) Patent No.: US 7,117,213 B2
(45) Date of Patent: Oct. 3, 2006

(54) PRIMARY-BACKUP GROUP WITH BACKUP RESOURCES FAILOVER HANDLER

(75) Inventors: Michael James McDermott, Oronoco, MN (US); Robert Miller, Rochester, MN (US); Michael John Snyder, Lake City, MN (US); Kiswanto Thayib, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 460 days.

(21) Appl. No.: 10/626,087

(22) Filed: Jul. 24, 2003

(65) Prior Publication Data

US 2005/0021573 A1    Jan. 27, 2005

(51) Int. Cl.
 *G06F 17/30* (2006.01)
(52) U.S. Cl. ........................................................ 707/10
(58) Field of Classification Search .............. 707/1–10, 707/100–104.1, 200–206; 714/10, 13, 50; 709/223; 705/30; 376/215
See application file for complete search history.

(56) References Cited

U.S. PATENT DOCUMENTS 6,594,786 B1* 7/2003 Connelly et al. ............. 714/50

2003/0061132 A1* 3/2003 Yu et al. ...................... 705/30
2003/0204539 A1* 10/2003 Bergsten ...................... 707/204

OTHER PUBLICATIONS

Patent Application entitled "Join Protocol for a Primary-Backup Group With Backup Resources in Clustered Computer System," filed on even date herewith by Robert Miller et al.

* cited by examiner

*Primary Examiner*—Diane D. Mizrahi
(74) *Attorney, Agent, or Firm*—Fleit, Kain, Gibbons, Gutman, Bongini & Bianco P.L.

(57) ABSTRACT

Failover processing that accommodates failures of backup computing nodes and resources, such as data storage units and printers. Failure of a computing node that controls resources causes another computing node to assume control of the resources controlled by the failed node. Failure of the primary computing node causes another computing node, at either the same or at a different site, to be selected as the new primary node. Failure of a resource at the primary site causes the site with the next highest priority backup resource to become the new primary site. Failure of a backup computing node causes a new backup node at the same site as the failed backup node to replace the failed backup node as host for the site's resources. Backup mirroring data flows are then adjusted to reflect the new functions of the affected nodes.

21 Claims, 6 Drawing Sheets

PRIMARY-BACKUP GROUP WITH BACKUP RESOURCES FAILOVER HANDLER

RELATED APPLICATION

The present invention is related to Ser. No. 10/626,088, filed on even date herewith by Robert Miller et al., and entitled, "Join Protocol for a Primary-Backup Group with Backup Resources in Clustered Computer System", which is assigned to the same assignee of the present application, and which is incorporated by reference herein.

BACKGROUND OF THE INVENTION

1. Field of the Invention

This invention relates to operation of automated data processing equipment and, more specifically, to failover processing of automated data processing equipment which utilizes redundant processors and resources.

2. Description of Related Art

Automated data processing applications often execute on processing systems that have multiple processors. These multiple processors are frequently organized as groups and all of the members or nodes within the group operate in a cooperative manner. An example of a tightly integrated group of processors is a multiple processor computing cluster. One or more of these processors within a group can be referred to as a "node," where a node is defined as one or more processors that are executing a single operating system image. A node that is part of a group is referred to herein as a member of the group or a member node. The various members within a group are connected by a data communications system that supports data communications among all of the group members.

The members within a group are sometimes divided among different physical locations. A particular member that is part of a physically disperse group generally has direct access to resources, such as data storage devices, printers, and other shared peripheral devices, that are collocated with and electrically connected to that member. The resources that are used in current group operations are referred to as primary resources. These groups many times also maintain redundant resources, referred to as backup resources, that contain duplicates, or mirrors, of the primary resource and that can be quickly configured to become primary resources if required. Maintaining redundant resources in a group avoids single point failures for the group's operation. Computing system groups communicate all data changes in a primary resource to one or more backup resources in order to maintain a consistent mirror of the primary resource at the backup resource.

A group that has a number of members typically defines one member to be the primary member for that group. The primary member is the primary point of access for the group and hosts the primary resources used by the group.

Groups sometimes maintain multiple backup resources, such as backup data storage units, for each primary resource. This further improves reliability and allows for greater geographical dispersion of backup resources. Conventional group processing is configured to efficiently handle substituting, i.e., perform failover processing for, the replacement of the primary member (e.g., computing node) with a backup member. The use of conventional group processing, although useful, is not without its problems.

One problem is the handling of failures of backup members and backup resources. Failures of primary resources generally result in the failover of a primary member to a backup member. However, a failure of a backup member generally results in the loss of backup processing for the group.

Another problem is the failover of a primary resource with mirroring to a backup resource. Often times the failover of a primary resource causes mirroring data routing, which is configured to communicate mirroring data from the failed primary to the one or more backup members, to become obsolete, often requiring manual reconfiguration of the mirroring data processing.

Therefore a need exists to overcome the problems with the prior art as discussed above, and particularly for a way to more efficiently handle failure of resources and backup nodes in group computing environments.

SUMMARY OF THE INVENTION

The exemplary embodiments of the present invention overcome the problems of the prior art by providing a system and method that perform processing to efficiently handle the transfer of processing and mirroring data flow in the event of failures to either computing group members, which are processing nodes in the exemplary embodiment, or to primary and/or backup resources that exchange mirroring data, such as data storage devices that are managed by computing group members.

Briefly, in accordance with the present invention, a method on a member of a computing system group for substituting members includes replacing an old member with a new member. The old member is assigned to a subgroup and controls at least one resource. The method further determines if the new member is within the subgroup. If the new member is within the subgroup, the method configures the new member to control resources that were controlled by the old member. If the new member is not in the subgroup, the method replaces the at least one resource with resources controlled by the new member. The method further configures a computing group communications system to accommodate replacement of the old member by the new member.

In another aspect of the present invention, a member of a computing system group has a group management component that: a) selects a new member to replace an old member. The old member is assigned to a subgroup and controls at least one resource, and b) determines if the new member is within the subgroup. The member further has a resource controller that: a) configures the new member to control resources that were controlled by the old member if the new member is within the subgroup, and b) replaces the at least one resource with resources controlled by the new member if the new member is not in the subgroup. The member also has a communications controller that configures a computing group communications system to accommodate replacement of the old member with the new member.

The foregoing and other features and advantages of the present invention will be apparent from the following more particular description of the preferred embodiments of the invention, as illustrated in the accompanying drawings.

BRIEF DESCRIPTION OF THE DRAWINGS

The subject matter which is regarded as the invention is particularly pointed out and distinctly claimed in the claims at the conclusion of the specification. The foregoing and other features and also the advantages of the invention will be apparent from the following detailed description taken in conjunction with the accompanying drawings. Additionally, the left-most digit of a reference number identifies the drawing in which the reference number first appears.

DESCRIPTION OF THE PREFERRED EMBODIMENTS

The present invention, according to a preferred embodiment, overcomes problems with the prior art by providing a system, a signal bearing medium and method that perform processing to efficiently handle the transfer of processing and mirroring data flow in the event of failures to either computing group members, which are processing nodes in this example, or to primary and/or backup resources, which include equipment with configuration and/or stored data information such as data storage, printers and any other resources managed by computing group members.

Computing System Group

Figure 1:
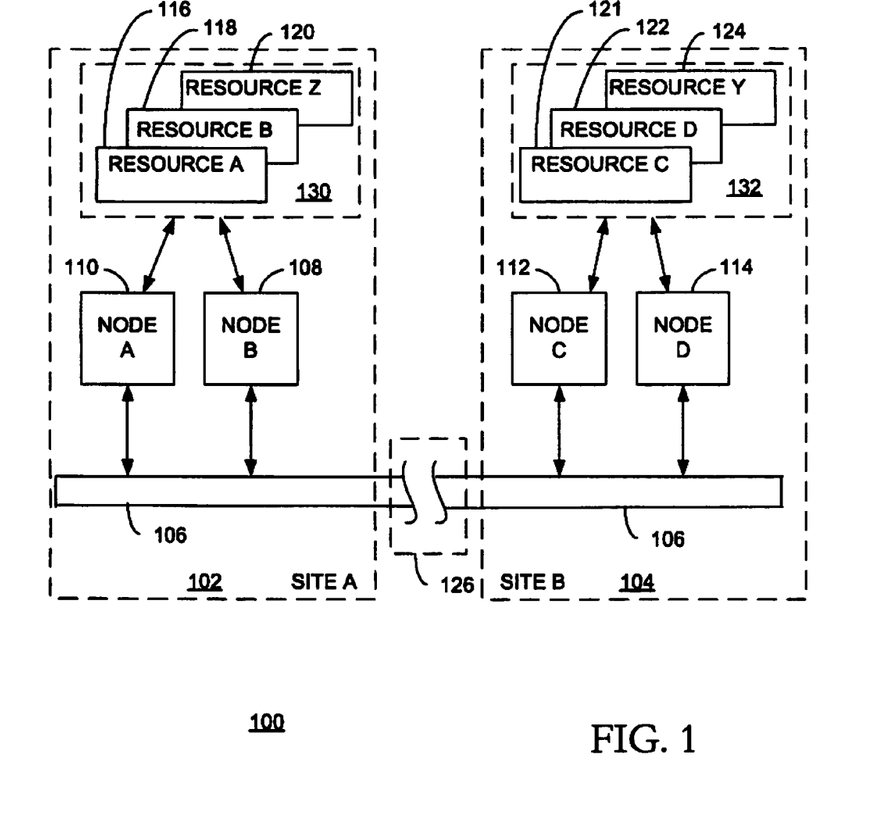
FIG. 1 is a computing system group illustrating the overall system architecture of an exemplary embodiment of the present invention.

Referring now in more detail to the drawings in which like numerals refer to like parts throughout several views, an exemplary computing system group 100 in which exemplary embodiments of the present invention operate is illustrated in FIG. 1. The exemplary computing system group 100 shows two sites, Site A 102 and Site B 104. Embodiments of the present invention operate with computing system groups that have any number of sites, from one to as many as are practical. The sites as used in this example are each defined to be a subgroup of computer nodes that have access to resources that are within a resource pool. For example, the nodes within Site A 102, i.e., Node A 110 and Node B 108, have access to the resources within Resource Pool A 130, i.e., Resource A 116, Resource B 118 and Resource Z 120. Similarly, the nodes within Site B 104, i.e., Node C 112 and Node D 114, have access to the resources in Resource Pool B 132, i.e., Resource C 121, Resource D 122 and Resource Y 124. In order to facilitate computer system group administration, the nodes that are located at a particular site are generally, but not necessarily, referred to as being in the same subgroup.

Each site in the exemplary embodiment has a number of nodes. Site A 102 is shown to have a Node A 110 and a Node B 108. Sites are able to have one to any practical number of nodes. These nodes are connected via a data communications network 106 that supports data communications between nodes that are part of the same site and that are part of different sites.

In this example, the sites are geographically removed from each other and are interconnected by an inter-site communications system 126. The inter-site communications system 126 connects the normally higher speed data communications network 106 that is contained within each site. The inter-site communications system 126 of the exemplary embodiment utilizes a high speed connection. Embodiments of the present invention utilize various inter-site communications systems 126 such as conventional WAN architectures, landline, terrestrial and satellite radio links and other communications techniques. Embodiments of the present invention also operate with any number of sites that have similar interconnections so as to form a continuous communications network between all nodes of the sites. Embodiments of the present invention also include "sites" that are physically close to each other, but that have computer nodes that do not have access to resources in the same resource pool. Physically close sites are able to share a single data communications network 106 and do not include a separate inter-site communications system 126.

Resources contained within resource pools, such as Resource Pool A 130 and Resource Pool B 132, include data storage devices, printers, and other peripherals that are controlled by one node within the group. A node that is controlling a resource is said to "host" that resource. In the exemplary embodiments, a node is equivalent to a member of a computing system group. In the computing system group 100, one node or member is designated as the primary member for the group. The primary group member hosts primary resources for the computing group and acts as the point of access and hosts the resources managed by the group.

The computing system group 100 of the exemplary embodiment maintains redundant resources to improve availability by providing fault tolerance for redundant computer nodes and resources. The computing system group 100 has resources that are designated and configured as "primary" resources. Primary resources are resources that are used for the current operations of the computing system group, such as the active data storage units used to store data for current operations. In addition to the primary resources, the computing system group 100 maintains one or more backup resources that mirror the operations of the primary resource. An example of a backup resource is a backup data storage unit that maintains a data mirror of the primary data storage unit and is able to assume the role of the primary resource in the event of a failure of the primary resource. Mirroring of resources in the exemplary embodiment is performed by conventional methods.

In order to improve fault tolerance, backup resources are typically maintained at a different physical location than the primary resource. The physical location or site that contains the primary resource in such a case is referred to as the production site and the location or site with the backup resource is referred to as the backup site. Mirroring of the primary resource at the backup resource allows the backup resource to readily become the primary resource for any reason, such as maintenance of components at the primary site, failure of the primary resource or of other equipment at the production site, or any operator preference.

Common operation of a computer system group 100 has one site, e.g., Site A 102, act as the production site and another site, e.g., Site B 104, act as the backup or mirroring site. One computing system member, such as Node A 110, at the production site is configured as the primary member and one computing system member, such as Node C 112, is configured as the backup member at another site. The primary member in this example is the computing system member that controls the primary resource and the backup member in this example is the computing system member that controls the backup resource that is mirroring the primary resource, and that is able to assume the role of the primary resource if needed or desired. In the case of a failure of the primary member, the exemplary embodiments operate to replace the old member, e.g., the failed primary member, with a new member, which might be at the same site or at another site.

As noted above, resources at a particular site are often accessible, and therefore controllable, by multiple computer nodes at that site. In the exemplary embodiment, the computer nodes that are able to control the same resources are assigned to the same subgroup. This allows any of those multiple nodes at a computer site, i.e., those computer nodes within the same subgroup, to host the resources at that site. In the event of a failure of a computer node that is hosting a resource, another computer node in the same subgroup is able to be configured to assume the control functions for the resources that were hosted by the failed computer node. In the event of such a replacement of computing system group members, mirroring data communications are reconfigured to reflect the new destinations and sources for mirroring data given the new hosting computer node communications address and configuration. In the exemplary computing system group 100, the active group members at Site A 102 and Site B 104 are configured to be Node A 110 and Node C 112, respectively. Node B 108 and Node D 114 are also able to become active group members if they have access to resources at that site. Node B 108 at Site A 102 is also able to become an active group member by assuming the functions of the hosting node for Resource Pool A 130. Node B 108 is thereby able to act as a hosting backup for Site A 102 in the event that the current host, i.e., Node A 110, fails. Site B 104 of the exemplary embodiment is similarly able to have node D 114 act as a backup node for Node C 112 whereby Node D 114 is able to become an active group member by assuming the hosting of Resource Pool B 132. In the exemplary embodiment, backup computing system group members, such as Node B 108 and Node C 112, have a specified order in which the members will become primary members in response to a failure of the primary member.

Computer system group 100 also maintains multiple backup resources of some resources. Maintaining multiple backup resources for the primary resource further improves availability and increases fault tolerance. Some processing architectures for maintaining multiple backup resources are able to broadcast mirroring data from the primary resource to each backup resource. Alternative processing architectures communicate mirroring data from the primary resource to a first backup resource and the first backup resource communicates mirroring data to a second backup resource. This process continues by the second backup resource communicating mirroring data to a third backup resource. This continues for all backup resources.

Each backup resource in the exemplary embodiment is assigned a computing system group member to control that resource. A computing system group member that controls backup resources is referred to as a backup member since the computing system group member controlling backup resources implements processing to cause the resource to mirror the primary resource. Members that do not currently control resources are also referred to as backup members if they are able to assume control of resources hosted by other members, as would be performed upon the failure of the member controlling those resources. Computer system groups that maintain multiple backups for the primary resource have an effective priority order for the multiple backup resources that is determined by the order in which the backup members that are controlling those resources are configured to assume the primary member function upon failure of an active primary member. This effective priority order defines, in the exemplary embodiment, the order in which backup resources are to be selected to become the primary resource. A backup resource that is hosted by the first backup node of the computing system group 100 is therefore the first backup resource.

In the event of a failure of the primary resource, the processing of the exemplary embodiment causes the first backup resource to replace the primary resource and to become a new primary resource. This causes the computing group member that is controlling the new primary resource to act as the new primary member. Similar processing is performed upon failure of the primary member if the preferred backup member is within a different subgroup than the failed primary member. The computing system group 100 then configures the computing group communications system, which includes the data communications network 106 and also the communication control and configuration components of the computing group members, to cause the resource mirroring data to be communicated from the new primary member to the new backup member in order to accommodate the replacement of the old primary member by the new primary member.

Resources that are mirrored in the exemplary embodiment include resources that contain data and/or configuration information and where a backup up resource is required to maintain consistent data and/or configuration data as the primary resource. A common resource that is mirrored in a computing system group is a data storage unit. Other resources are able to be mirrored or to only have their configuration maintained at a backup location. An example of such resources includes printers, where a backup printer is located at a remote site and a node controlling the backup printer maintains configuration information, such as level of Postscript, page orientation, and/or job control codes, so that printing can be readily redirected to the backup printer. Embodiments of the present invention are also used to mirror printer queue data, whereby printer data is processed not only at the production site printer, but a backup node receives a mirrored copy of data to be printed but does not actually print this data. This allows the node hosting the backup printer to continue printing the currently printing task in the event of a failure.

Computer Nodes and Group Members

Figure 2:
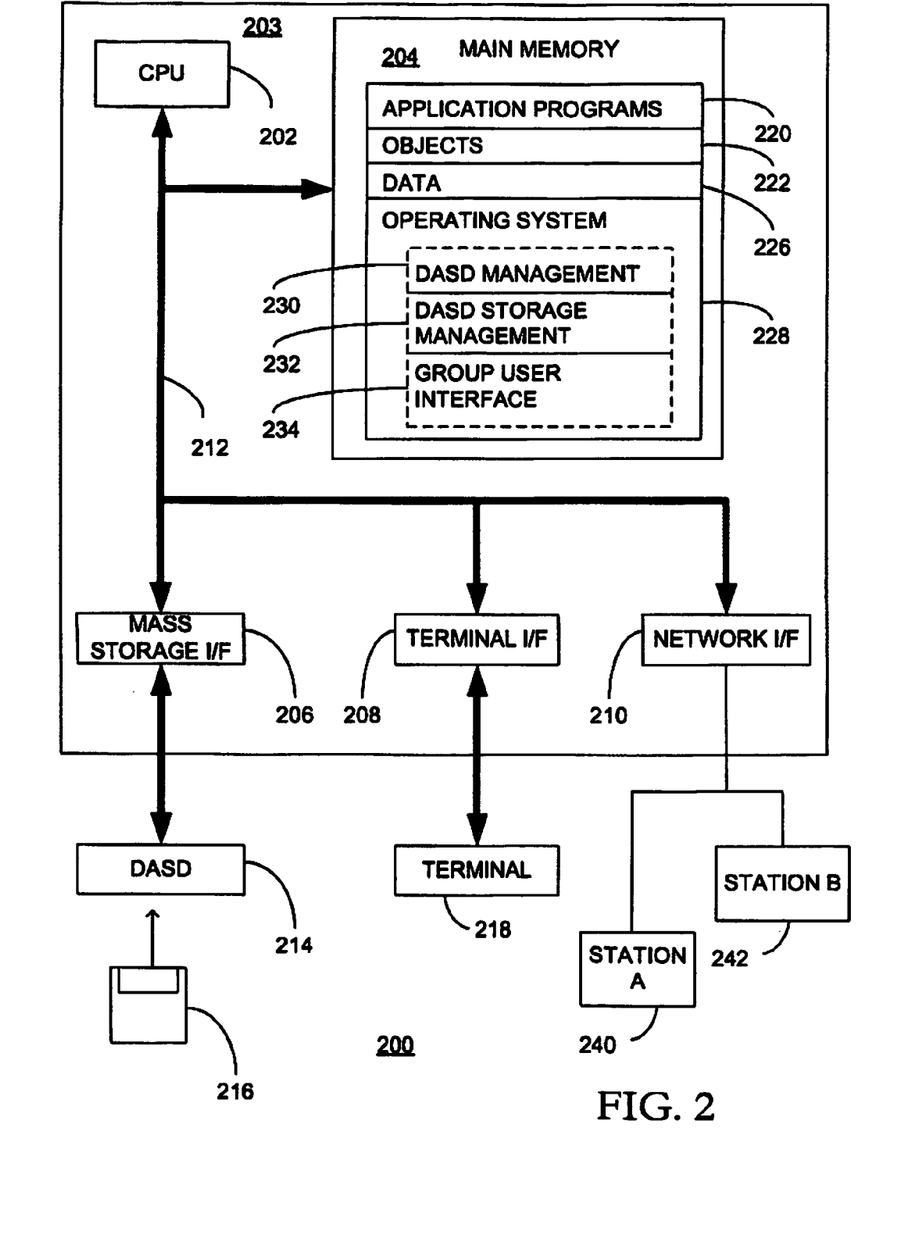
FIG. 2 is a block diagram depicting a group member of the group shown in FIG. 1, according to an exemplary embodiment of the present invention.

A block diagram depicting a group member 200, which is a computer system, such as node A 110, according to an embodiment of the present invention is illustrated in FIG. 2. The group member 200 of the exemplary embodiment is an IBM eServer iSeries server system. Any suitably configured processing system is similarly able to be used by embodiments of the present invention. The computer system 200 has a processor 202 that is connected to a main memory 204, mass storage interface 206, terminal interface 208 and network interface 210. A system bus 212 interconnects these system components. Mass storage interface 206 is used to connect mass storage devices, such as DASD device 214, to the computer system 200. One specific type of DASD device is a floppy disk drive, which may be used to store data to and read data from a floppy diskette 216.

Main Memory 204 contains application programs 220, objects 222, data 226 and an operating system image 228. Although illustrated as concurrently resident in main memory 204, it is clear that the applications programs 220, objects 222, data 226 and operating system 228 are not required to be completely resident in the main memory 204 at all times or even at the same time. Computer system 200 utilizes conventional virtual addressing mechanisms to allow programs to behave as if they have access to a large, single storage entity, referred to herein as a computer system memory, instead of access to multiple, smaller storage entities such as main memory 204 and DASD device 214. Note that the term "computer system memory" is used herein to generically refer to the entire virtual memory of computer system 200.

Operating system 228 is a suitable multitasking operating system such as the IBM OS/400 operating system. Embodiments of the present invention are able to use any other suitable operating system. Operating system 228 includes a DASD management user interface program 230, a DASD storage management program 232 and a group user interface program 234. The DASD storage management program 232 performs the functions of a resource controller in the exemplary embodiment. Embodiments of the present invention utilize architectures, such as an object oriented framework mechanism, that allows instructions of the components of operating system 228 to be executed on any processor within computer 200.

Although only one CPU 202 is illustrated for computer 203, computer systems with multiple CPUs can be used equally effectively. Embodiments of the present invention incorporate interfaces that each include separate, fully programmed microprocessors that are used to off-load processing from the CPU 202. Terminal interface 208 is used to directly connect one or more terminals 218 to computer 203. These terminals 218, which are able to be non-intelligent or fully programmable workstations, are used to allow system administrators and users to communicate with computer system 200.

Network interface 210 is used to connect other computer systems or group members, e.g., Station A 240 and Station B 242, to computer 203. The present invention works with any data communications connections including present day analog and/or digital techniques or via a future networking mechanism. The network interface 210 of the exemplary embodiment includes functions to implement a group management component and a communications controller. The group management component of the exemplary embodiment maintains the configuration of the computing system 200, including its status as the primary or backup member that is hosting the primary or a backup resource, respectively. The communications controller functions include ensuring proper communications of resource mirroring data, as is known in the relevant arts.

Although the exemplary embodiments of the present invention are described in the context of a fully functional computer system, those skilled in the art will appreciate that embodiments are capable of being distributed as a program product via floppy disk, e.g. floppy disk 216, CD ROM, or other form of recordable media, or via any type of electronic transmission mechanism.

Embodiments of the present invention include an operating system 228 that includes a DASD management user interface program 230 that performs functions related to configuration, operation and other management functions, including functions for selecting one or more DASDs for an auxiliary storage pool (ASP). An ASP is defined as a set of disk units, and an independent auxiliary storage pool (IASP) is a set of disk units independent of a system. An IASP can be switched between systems, if its disk units are switchable and follow configuration and placement rules. The DASD management user interface program 230 is able to communicate with DASD storage management (DSM) program 232, which is a component of operating system 228 that provides internal support for managing disk units. The DASD storage management program 232 includes the functions for the resource controller of the exemplary embodiment or signal bearing medium.

Processing Flows

Figure 3:
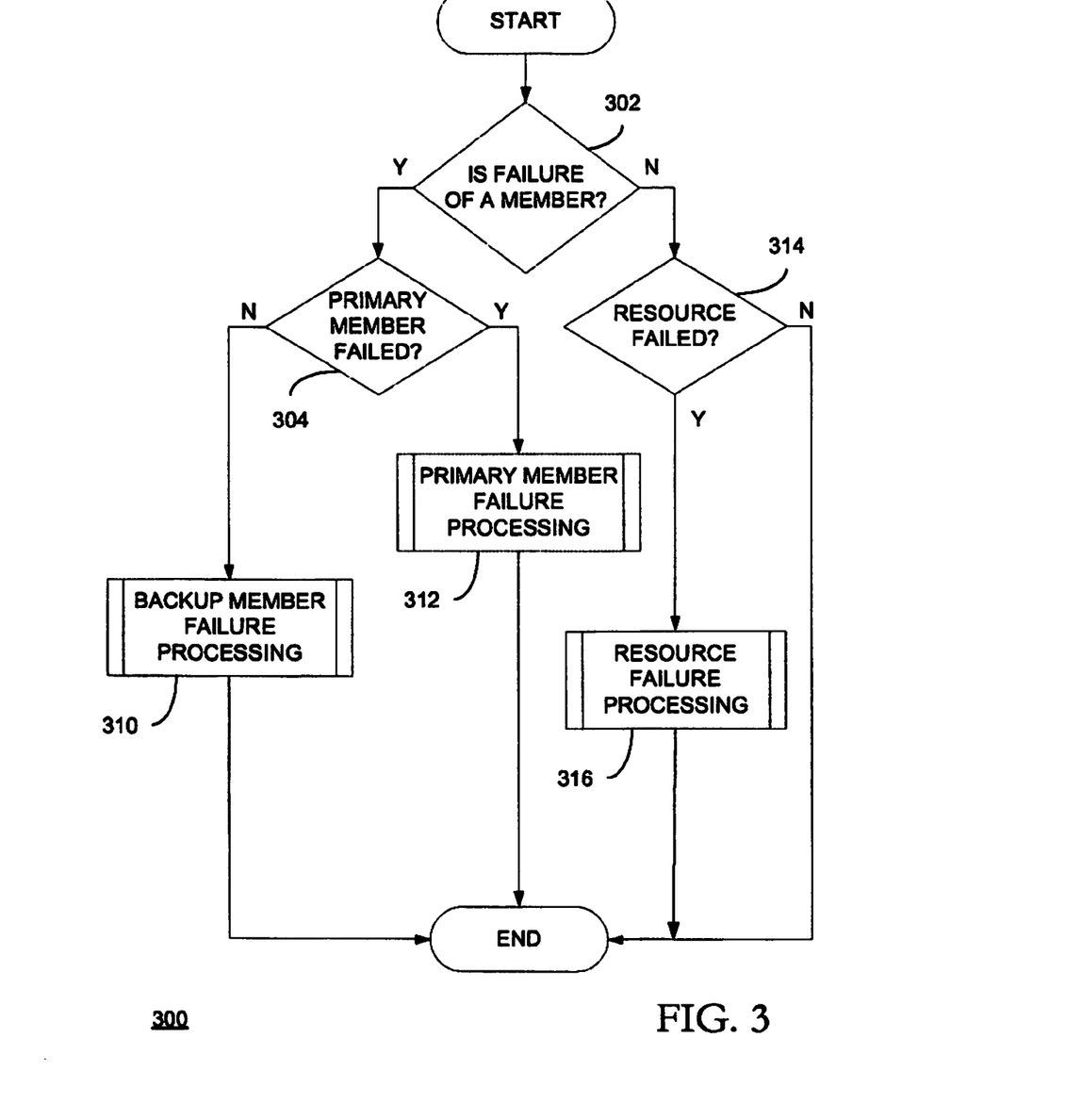
FIG. 3 is a top level failure processing flow diagram according to an exemplary embodiment of the present invention.

A top level failure processing flow 300 diagram according to an exemplary embodiment of the present invention is illustrated in FIG. 3. The top level failure processing flow 300 is performed upon an indication that a failure occurred within the group 100. The group 100 of the exemplary embodiment includes a standard group communications mechanism that alerts all group members of any failures within group members or resources. The top level failure processing 300 begins by determining, at step 302, if the failure is of a member of the group, such as within a processing node. If the failure is of a group member, the processing continues by determining, at step 304, if the failed member was the primary member. The primary member in this context is a member that is hosting the primary resource that is used by the computing group, such as a production data storage unit. If the failed member is the primary member, the processing continues by performing, at step 312, the primary member failure processing, which is described in detail below.

If the failure was determined, at step 304, to not be within the primary member, the processing continues by performing, at step 310, the backup member failure processing, which is described in detail below. The processing then terminates.

At step 302, if the failure was determined to not be of a member of the computing group, the processing determines, at step 314, if the failure was within a resource that is able to be used by the members of the group. If the failure was of a resource, the processing performs, at step 316, the resource failure processing that is described below. If the failure was not of a resource that is able to be used by members of the group, the processing terminates.

Figure 4:
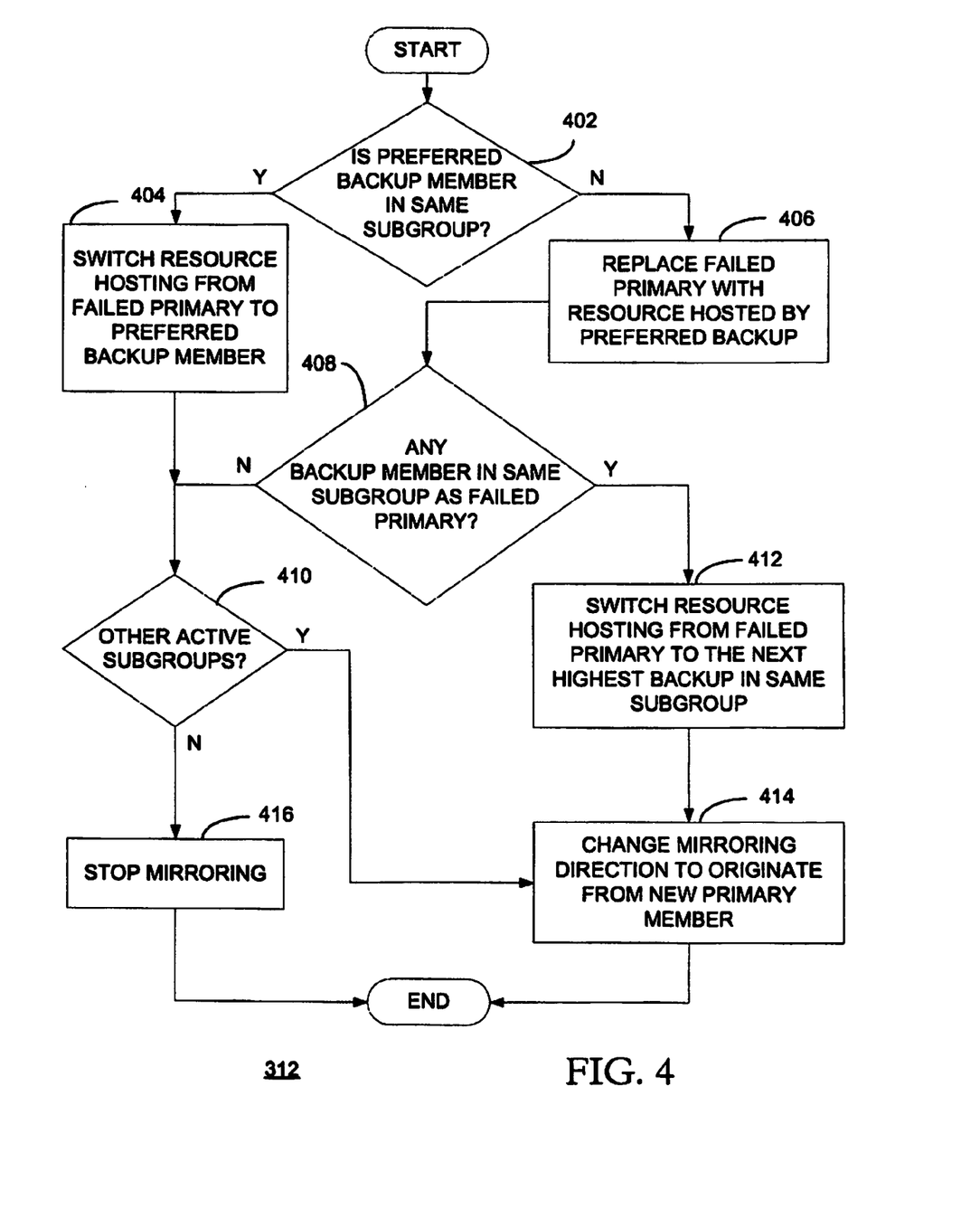
FIG. 4 is a primary member failure processing flow diagram of the top level failure processing of FIG. 3, according to an exemplary embodiment of the present invention.

A primary member failure processing 312 diagram according to an exemplary embodiment of the present invention is illustrated in FIG. 4. The primary member failure processing flow 312 begins by determining, at step 402, if the preferred backup member for the failed primary member is in the same subgroup, which corresponds to being at the same site in the exemplary embodiment, as the failed primary member. If the preferred backup member is in the same subgroup as the failed primary member, the processing continues by replacing, at step 404, to the preferred backup member the hosting functions for the resources that were controlled by the failed primary member. This processing thereby causes the backup member to replace the failed primary member. The backup member is then configured to control the resources that were hosted by the failed primary member. The processing then continues by determining, at step 410, if there are other active subgroups, as is described below.

If the preferred backup member is determined, at step 402, to not be in the same subgroup as the failed primary member, the processing continues by replacing, at step 406, the resources hosted by the failed primary member with the resources controlled by the new primary member. This results in the site in the previously backup resources becoming the new primary resources and the site containing the new primary member thereby becomes the new production site. The processing then continues by determining, at step 408, if there are any backup members within the same subgroup as the failed primary. If there are other backup members in the same subgroup as the failed primary, the processing continues by switching, at step 412, resource hosting from the failed primary to the next highest backup in the same subgroup. This switch is performed by configuring the next highest backup member in the subgroup to control the resources that were controlled by the failed primary member. This advantageously allows the resources that were hosted by the failed primary to continue to operate within the group, as a backup since the primary resources have been transferred in this case, by using another node within the subgroup as a host. The processing then changes, at step 414, the direction of mirroring data communications so as to originate from the new primary member to the other backup members. Configuring the computing group communications system so as to accommodate the replacement of the old member with the new member performs this change of direction, If it was determined, at step 408, that there was not a backup member in the same subgroup as the failed primary, or after resource hosting was switched, at step 404, to a backup member in the same subgroup, the processing continues by determining, at step 410, if there are other active subgroups. If it is determined that there are other active subgroups, the processing continues by changing, at step 414, the direction of mirroring data communications so as to originate from the new primary member to the other backup members. If it is determined that there are no other active subgroups, the processing continues by stopping, at step 416, mirroring for the primary resources.

Figure 5:
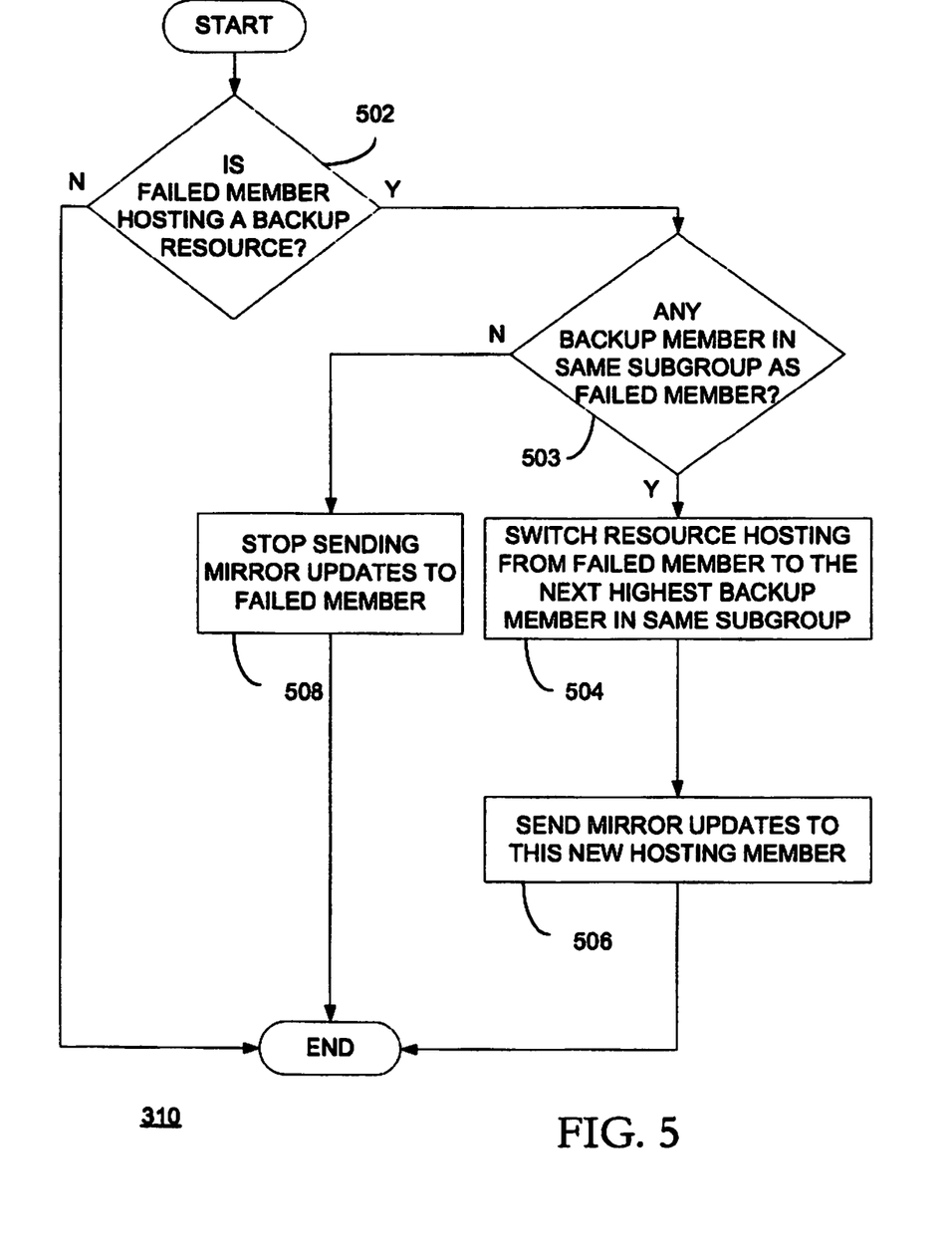
FIG. 5 is backup member failure processing flow diagram of the top level failure processing of FIG. 3, according to an exemplary embodiment of the present invention.

A backup member failure processing 310 diagram according to an exemplary embodiment of the present invention is illustrated in FIG. 5. The backup member failure processing 310 begins by determining, at step 502, if the failed member was hosting a backup resource. If it is determined that the failed member was not hosting a backup resource, the backup member failure processing 310 terminates.

If it is determined that the failed backup member was hosting a backup resource, the processing continues by determining, at step 503, if there are any backup members in the same subgroup as the failed backup member. If it is determined that there are no backup members in the same subgroup as the failed backup member, the processing continues by stopping, at step 408, the sending of mirror update data to the failed backup member. If there are backup members in the same subgroup as the failed backup member, the processing continues by replacing the failed member with a new member, that is the next highest backup that is within the same subgroup, so as to switch, at step 504, resource hosting from the failed backup member to this next highest backup member in the same subgroup. This causes the next highest backup member in the same subgroup to replace the failed backup member. This advantageously allows the resources that were hosted by the failed backup member to continue to operate as backup resources by reassigning hosting of those resources to a backup node at the same site, i.e., within the same subgroup. The processing then continues by configuring data communications to send, at step 506, mirror update data to the newly assigned backup member so as to accommodate replacement of the failed member with the new backup member. The processing then terminates.

Figure 6:
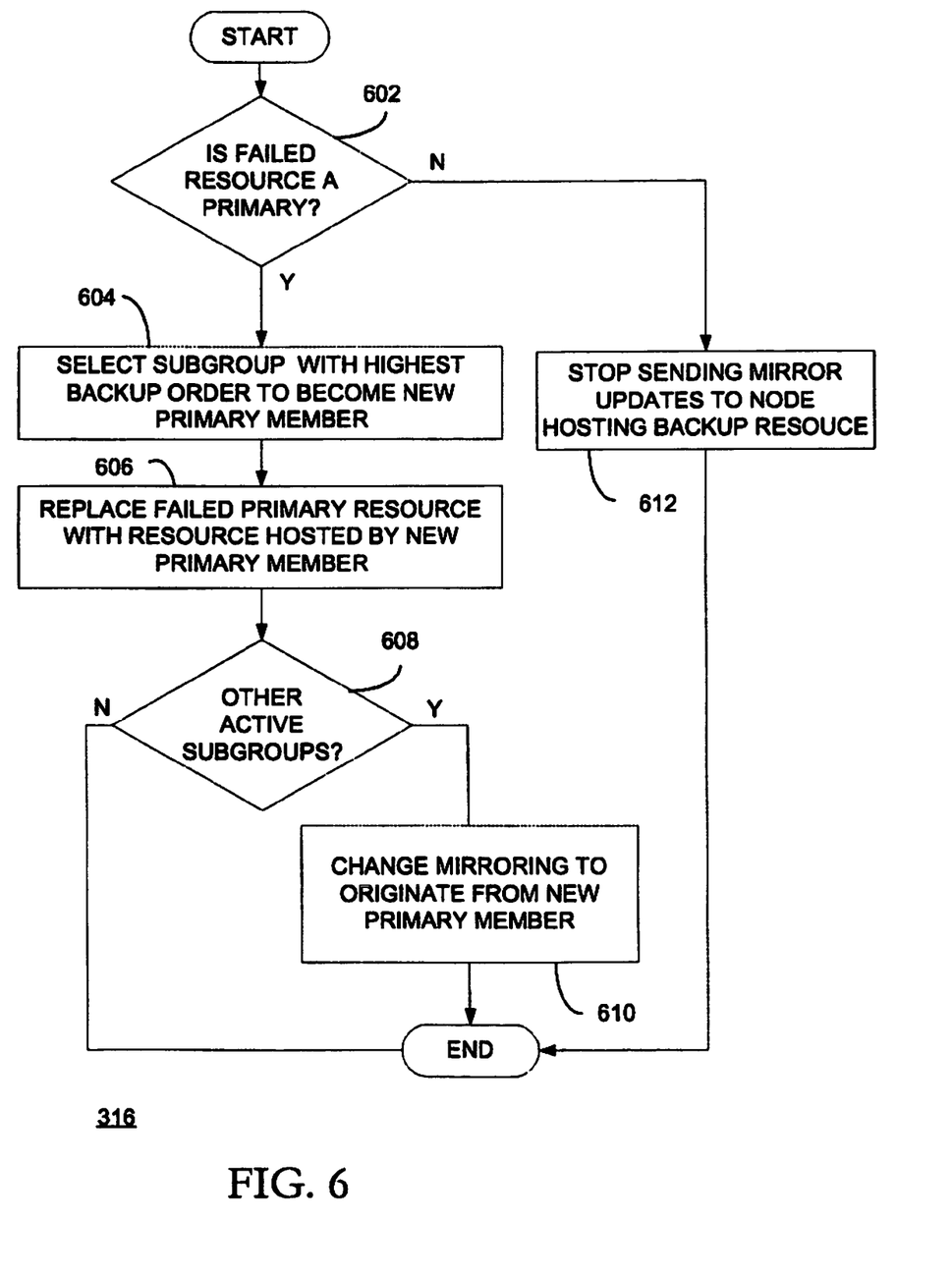
FIG. 6 is a resource failure processing flow diagram of the top level failure processing of FIG. 3, according to an exemplary embodiment of the present invention.

A resource failure processing 316 diagram according to an exemplary embodiment of the present invention is illustrated in FIG. 6. The resource failure processing 316 first determines, at step 602, if the failed resource was the primary or a backup resource. If the resource was determined to be the primary resource, the processing of the exemplary embodiment continues by selecting, at step 604, a subgroup that is different than the subgroup with the failed member and that that has the member with the highest backup priority. The processing then changes, at step 606, the resource hosted by the new primary member to become the new primary resource for the group 100, thereby replacing the old primary resource with the resource hosted by the new primary member. The processing then determines, at step 608, if there are one or more other active subgroups within the computing group. If there are other active subgroups, the processing advances by changing, at step 610, the mirroring data communications so that information regarding mirroring of the resource is properly sent to the other subgroups for proper backup.

If the failed resource was not the primary resource, the processing continues by ceasing, at step 612, to send mirroring information for that resource to the member that is hosting the failed resource.

Non-limiting Software and Hardware Examples

Embodiments of the invention can be implemented as a program product for use with a computer system such as, for example, the cluster computing environment shown in FIG. 1 and described herein. The program(s) of the program product defines functions of the embodiments (including the methods described herein) and can be contained on a variety of signal-bearing medium. Illustrative signal-bearing medium include, but are not limited to: (i) information permanently stored on non-writable storage medium (e.g., read-only memory devices within a computer such as CD-ROM disk readable by a CD-ROM drive); (ii) alterable information stored on writable storage medium (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the present invention, whether implemented as part of an operating system or a specific application, component, program, module, object or sequence of instructions may be referred to herein as a "program." The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It is also clear that given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.) It should be appreciated that the invention is not limited to the specific organization and allocation or program functionality described herein.

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

Each computer system may include, inter alia, one or more computers and at least a signal bearing medium allowing a computer to read data, instructions, messages or message packets, and other signal bearing information from the signal bearing medium. The signal bearing medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the signal bearing medium may comprise signal bearing information in a transitory state medium such as a network link and/or a network interface, including a wired network or a wireless network, that allow a computer to read such signal bearing information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. A method on a member of a computing system group for substituting members, the method comprising:
   replacing an old member with a new member, wherein the old member is assigned to a subgroup and controls at least one resource;
   determining if the new member is within the subgroup and is thereby able to control the at least one resource;
   configuring, in response to determining the new member is within the subgroup and is thereby able to control the at least one resource, the new member to control the at least one resource that was controlled by the old member;
   replacing, in response to determining the new member is not in the subgroup and is thereby not able to control the at least one resource, the at least one resource with resources controlled by the new member;
   producing a computing group communications configuration to accommodate replacement of the old member by the new member, and
   configuring a computing group communication system with the computing group communications configuration.

2. The method according to claim 1, wherein the old member is a primary member of a computing system group.

3. The method according to claim 1, wherein the replacing is performed in response to a failure of the old member.

4. The method according to claim 1, wherein the new member is in the subgroup, the old member was a primary member of the subgroup and the new member becomes a backup member of the subgroup, wherein the old member and the new member are able to control the at least one reasource and the new member assumes control of the at least one resource.

5. The method according to claim 1, wherein the old member is a backup member and wherein the new member replaces the old member in a backup priority.

6. The method according to claim 1, wherein the replacing is performed in response to a failure of at least one of the at least one resources.

7. The method according to claim 6, further comprising selecting a new resource to be substituted for the at least one of the at least one resource, and wherein the new member is selected based upon its controlling the new resource that is selected to be substituted for the at least one of the at least one resources.

8. A member of a computing system group, the member comprising:
   a group management component for:
      selecting a new member to replace an old member, wherein the old member is assigned to a subgroup and controls at least one resource; and
      determining if the new member is within the subgroup and is thereby able to control the at least one resource;
   a resource controller for:
      configuring, in response to determining the new member is within the subgroup and is thereby able to control the at least one resource, the new member to control the at least one resource that was controlled by the old member;
      replacing, in reponse to determining the new member is not in the subgroup and is thereby not able to control the at least one resource, the at least one resource with resources controlled by the member; and producing a computing group communications configuration to accommodate replacement of the old member by the new member; and a communications controller for configuring a computing group communications system with the computing group communications configuration.

9. The member according to claim 8, wherein the old member is a primary member of a computing system group.

10. The member according to claim 8, wherein the group management component, the resource controller and the communications controller operate in response to a failure of the old member.

11. The member according to claim 8, wherein the new member is in the subgroup, the old member was a primary member of the subgroup and the group management component operates to cause the new member to become a backup member of the subgroup, wherein the old member and the new member are able to control the at least one resource and the new member assumes control of the at least one resource.

12. The member according to claim 8, wherein the old member is a backup member and wherein the new member replaces the old member in a backup priority.

13. The member according to claim 8, wherein the group management component, the resource controller and the communications controller operate in response to a failure of at least one of the at least one resources.

14. The member according to claim 13, wherein the group management controller selects a new resource to be substituted for the at least one of the at least one resource, and selects the new member based upon its controlling the new resource that is selected to be substituted for the at least one of the at least one resources.

15. A signal bearing medium including a program which, when executed by a processor, performs operations for substituting members, the program being tangibly embodied in the signal bearing medium, the operations comprising:
 selecting a new member to replace an old member, wherein the old member is assigned to a subgroup and controls at least one resource;
 determining if the new member is within the subgroup and is thereby able to control the at least one resource;
 configuring, in response to determining the new member is within the subgroup and is thereby able to control the at least one resource, the new member to control the at least one resource that was controlled by the old member;
 replacing, in response to determining the new member is not in the subgroup and is thereby not able to control the at least one resource, the at least one resource with resources controlled by the new member;
 producing a computing group communications configuration to accommodate replacement of the old member with the new member; and configuring a computing group communications system with the computing group communications configuration.

16. The signal bearing medium of claim 15, wherein the old member is a primary member of a computing system group.

17. The signal bearing medium of claim 15, wherein the operations are performed in response to a failure of the old member.

18. The signal bearing medium of claim 15, wherein the new member is in the subgroup, the old member was a primary member of the subgroup and the new member becomes a backup member of the subgroup, wherein the old member. and the new member are able to control the at least one resource and the new member assumes control of the at least one resource.

19. The signal bearing medium of claim 15, wherein the old member is a backup member and wherein the new member replaces the old member in a backup priority.

20. The signal bearing medium of claim 15, wherein the operations are performed in response to a failure of at least one of the at least one resources.

21. The signal bearing medium of claim 20, the operations further comprising selecting a new resource to be substituted for the at least one of the at least one resource, and wherein the new member is selected based upon its controlling the new resource that is selected to be substituted for the at least one of the at least one resources.

* * * * *